(No Model.) 2 Sheets—Sheet 1.
M. T. HANCOCK.
SULKY PLOW.
No. 379,892. Patented Mar. 20, 1888.
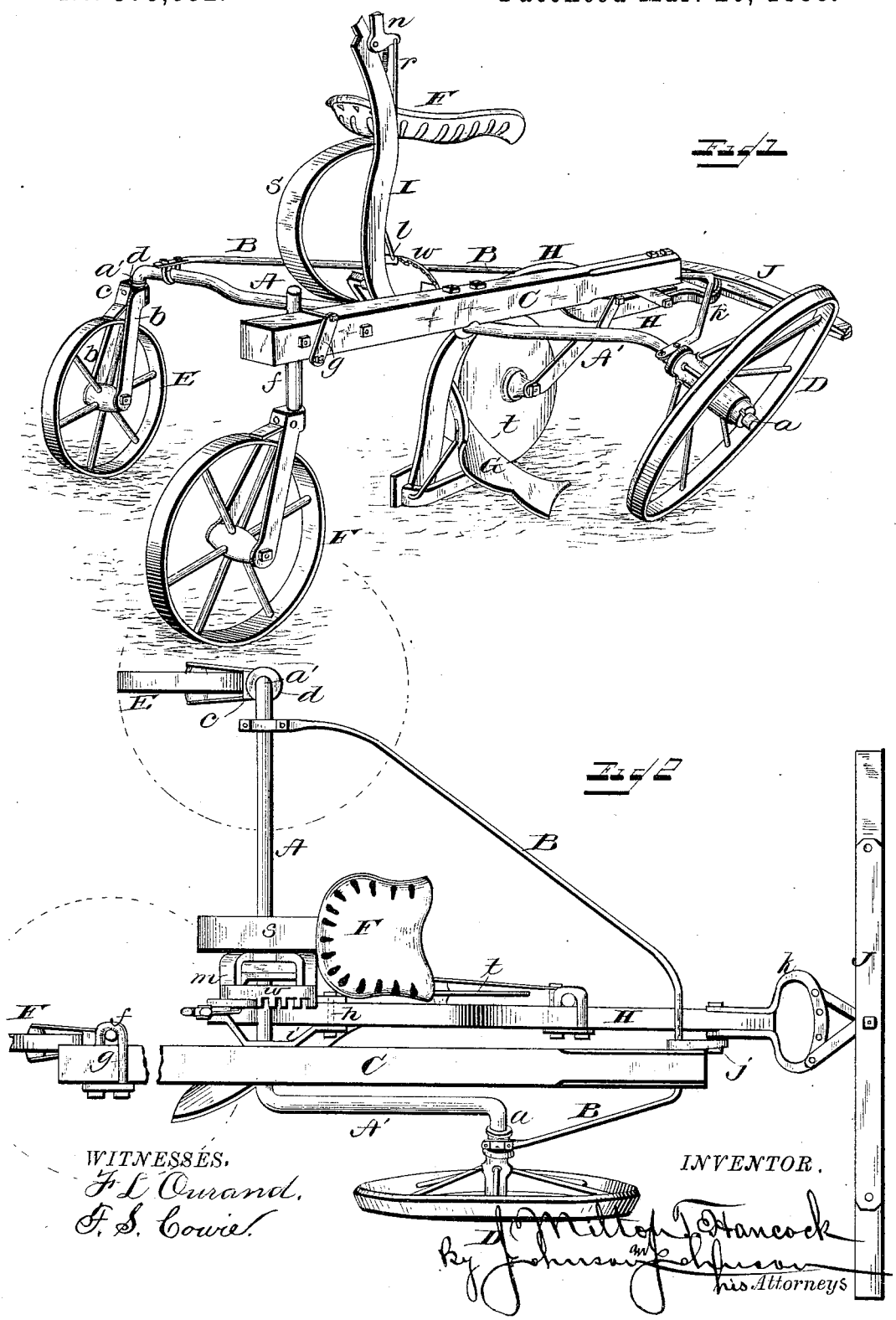

(No Model.) 2 Sheets—Sheet 2.
M. T. HANCOCK.
SULKY PLOW.
No. 379,892. Patented Mar. 20, 1888.
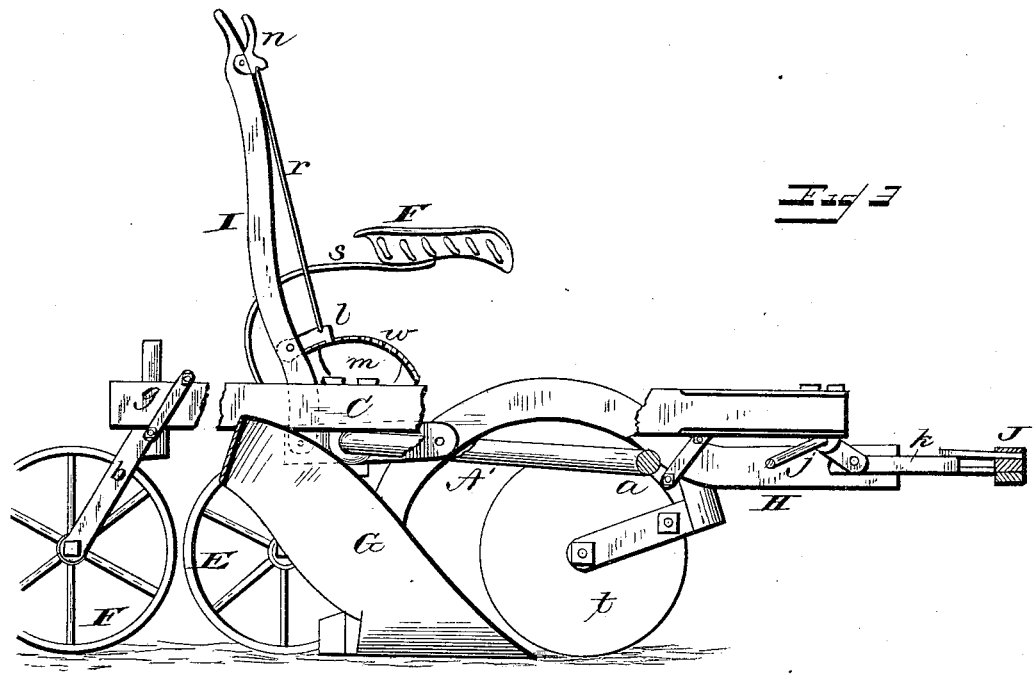
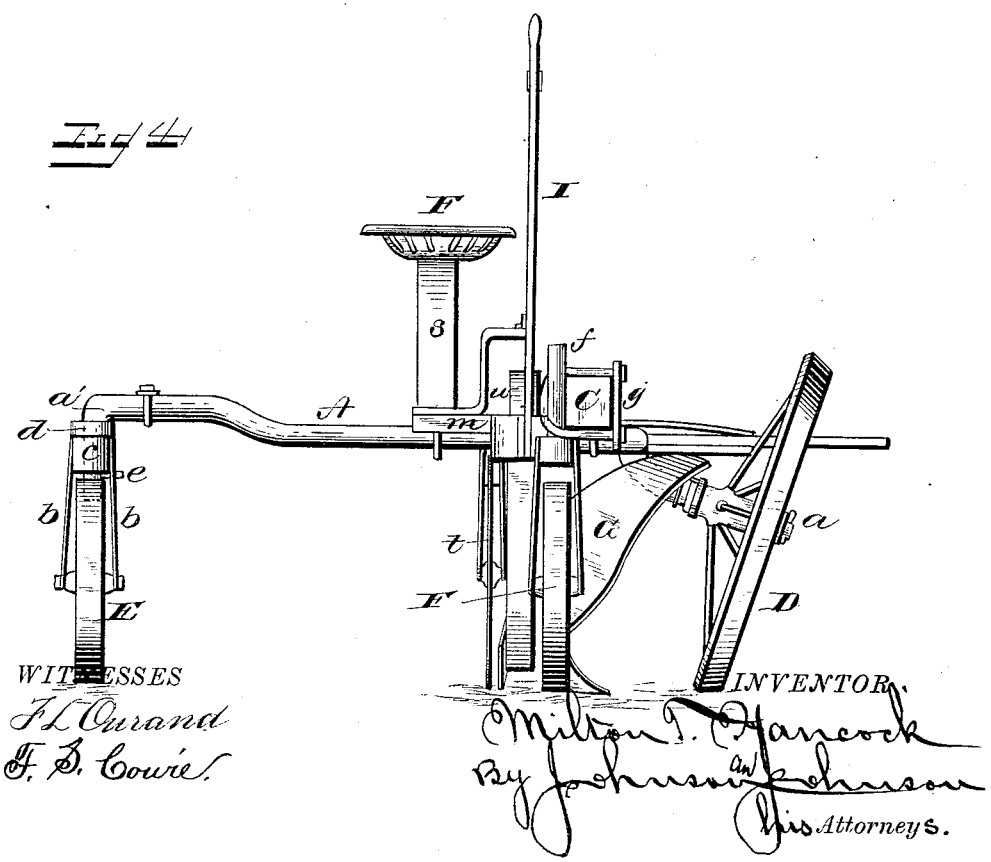
WITNESSES
F. L. Ourand
F. B. Cowie
INVENTOR
Milton T. Hancock
By Johnson & Johnson
his Attorneys.

UNITED STATES PATENT OFFICE.

MILTON T. HANCOCK, OF LITTLE ROCK, ARKANSAS, ASSIGNOR TO THE HANCOCK PLOW COMPANY, OF SAME PLACE.

SULKY-PLOW.

SPECIFICATION forming part of Letters Patent No. 379,892, dated March 20, 1888.

Application filed December 20, 1887. Serial No. 258,448. (No model.)

*To all whom it may concern:*

Be it known that I, MILTON T. HANCOCK, a citizen of the United States, residing at Little Rock, in the county of Pulaski and State of Arkansas, have invented new and useful Improvements in Sulky-Plows, of which the following is a specification.

The object of my invention is to improve the wheeled plow for which Letters Patent were granted to me July 5, 1887, No. 366,094, in such manner as to adapt the implement for easy and perfect control by the team. I dispense with the draft tongue or pole, and thus avoid the knocking of the horses, relieve their necks of the weight of the pole and frame, and permit the use of three horses, which cannot be conveniently used as a team with a draft-pole made rigid with the frame. I support the frame in such manner as to distribute the weight of the plow and to make its beam the draft-beam of the machine. This is effected by means of two caster or swivel wheels so combined and disposed in relation to the right or furrow wheel and the frame as that one of said swivel-wheels will travel in the furrow being made while the other is at the left end of the axle, and both having a free swiveling action in every direction and within the limits of a complete circle, so as to permit the free turning at the end of the land of the carriage and plow squarely around by the pull of the team direct upon the plow-beam, and not by means of a draft-pole. By dispensing with the rigid draft-pole the furrow and the land caster-wheels are left free and easy in their supporting function for the plow, leaving the furrow or right wheel free to control the plow and keep it in line with the furrow in which the right wheel travels. The three carrying-wheels are disposed in triangular relation with the plow, and the provision of two swivel-wheels disposed as stated relieves all binding, grinding, and forcing of the plow, leaving it perfectly free to be drawn and lessening the draft. The furrow-traveling swivel-wheel is of great importance in preventing the plow-beam and the front of the carriage from being forced up, and the plow thereby prevented from being thrown out of the ground by the colter striking or running over obstructions. In such a construction of carriage and disposition of the swivel-wheels and the furrow or guiding wheel the plow-beam is extended in front of the carriage-frame, is braced and suspended from the front thereof, and is pivotally connected in advance of the axle by means of a hanger mounted thereon, so that in turning the plow at the end of the land the horses walk around to their proper place, pulling sidewise upon the beam at its point of braced suspension with the carriage-frame, making the turn short and easy.

In another application for a patent filed by me of date August 13, 1887, Serial No. 246,830, for improvement in wheeled plows, I have described, shown, and claimed certain improvements embracing the combination and relation of the axle having a furrow-wheel at the right end in advance thereof, a swivel or caster wheel at its left or land end, and a rigid tongue for the team.

My present improvements possess highly important advantages in the provision of a furrow-swivel or caster-wheel, whereby I am enabled to dispense with the carriage draft pole or tongue, greatly lessening the draft of the plow and allowing the machine to be easily turned within a comparatively small space by the swiveling action of the two casters.

Referring to the accompanying drawings, Figure 1 represents in perspective my improved sulky-plow. Fig. 2 is a top view. Fig. 3 is a longitudinal section, and Fig. 4 is a rear elevation.

The frame of the machine consists of an axle, A, a front brace, B, connected with each end of the axle, and a beam, C, arranged longitudinally, connected with the front brace and with the axle, and extending a short distance in the rear thereof.

The axle which I prefer to use is of peculiar form, having its right end portion bent forward in the line of the draft and forms a crank or L-shaped arm, A', whose end is bent outward, so as to form a journal-bearing arm, $a$, for the furrow-wheel D. The other end of the axle terminates in a vertical journal-bearing arm, $a'$, standing downward for a caster or swivel wheel, E. These several bends of the axle have different relations to the middle part, and the axle crank-arm A' is of such a length as to bring the furrow-wheel about twelve inches in front of the axle and of the land caster-wheel.

The frame-beam C is placed along and near the axle crank-arm, and the plow-beam is pivotally carried by the axle and by the front brace alongside of the frame-beam, while the driver's seat is mounted upon the axle at the left side of the plow-beam, as I shall more fully hereinafter describe. As stated, the left end of the axle stands downward and forms the bearing-arm $a'$ for the caster or swivel wheel E, which is of a size suited for the furrow-wheel.

The swivel-wheel is mounted by carrying-arms $b\ b$, secured to a metallic block, $c$, through an opening in which the vertical axle-arm passes, and has its bearing by a collar, $d$, resting on the top of the block, while a pin, $e$, passing through the lower end of the axle-arm underneath the said block, serves to confine the caster-frame to the axle-arm.

For the purpose of dispensing with the draft tongue or pole, effecting a uniform distribution of the weight of the frame and the plow attachments, and for more easily controlling and turning the machine, I provide a second caster or swivel wheel, F, which I call the "furrow-caster." It is secured to the rear end of the frame-beam by means of a pintle or cylindrical stem, $f$, clamped and firmly bound against the inner side of the said frame-beam by means of a yoke-clip, $g$, or any suitable fastening, so as to run at the rear of the plow in its furrow. This caster-wheel is placed sufficiently in rear of the plow to be free to turn upon its pintle in any direction within the range of a complete circle, and, following the path of the plow, it co-operates with the land caster-wheel in permitting the machine to be turned easily and quickly.

The furrow-wheel may stand upright; but, as shown, it is mounted so as to stand obliquely upward and outward, and, running in the furrow, prevents side draft of the machine, and for this purpose the bearing-arm $a$ of the axle-crank inclines downward, as shown. This wheel forms the guide-wheel, and its disposition in relation to the land caster-wheel and the furrow caster-wheel permits the caster-wheels to turn together beneath the frame upon their pintle-bearings in turning the machine.

The plow G may be of any approved form, and is preferably carried by a beam, H, terminating in a curved standard, which is pivoted at $h$, Fig. 2, to the front ends of a hanger, $i$, hung so as to turn freely upon the axle and extend both in front and in rear thereof.

The plow-beam extends in front of the frame-brace and is connected to it by a link, $j$, so that the plow-beam pulls upon the frame by this link and by the axle-hanger. The draft-clevis $k$ is secured to the front end of the plow-beam, and the doubletree J for the team is pivoted to the clevis, so that in turning and pulling the machine the team draws directly upon the plow-beam. The plow is raised and lowered, as may be desired, by means of a hand-lever, I, rigidly attached to the rear end of the hanger and rising within convenient reach of the driver upon his seat. This lever is provided with a latch device, $l$, adapted to lock with curved rack $w$, fixed to and rising from a plate, $m$, clipped to the axle. This latch is controlled by a small spring thumb-lever, $n$, and rod $r$, so that by pulling the hand-lever back the plow is raised so as to set it for the desired depth in the ground or raised entirely out of the ground.

The seat-support $s$ is fastened to the plate $m$, so as to carry the seat over and in front of the axle.

A colter, $t$, of the rotating cutter form is carried by an arm or hanger clipped to the plow-beam, as shown. By this construction the caster-wheels do not act to guide the plow in the furrow-line; but such guiding is solely effected by means of the furrow-wheel and the draft applied directly to the plow-beam.

In turning the plow both caster-wheels will describe a circle upon their pintles, and the plow can be raised or remain in the ground during such turning. As the swivel-wheels will follow their lead, they leave the furrow-wheel and the plow-beam free to control and to guide the plow in its path and carry its weight equally distributed upon the frame.

I prefer to use the frame-beam, because it braces and holds the plow-carriage firmly and because it serves to carry the furrow caster-wheel in the furrow behind the plow. This frame-beam is clipped to the axle and to the front brace, B, and the latter is clipped to the axle arms. I know that it has been proposed to mount the frame of a sulky-plow upon three wheels, one of which is placed in the rear of the plowshare and runs in the "live" furrow; but such furrow-wheel has been mounted upon an inclined bearing-arm so as to stand in an inclined position and serves to distribute the weight of the plow and to dispense with the tongue; but the combination of the three wheels—two of which are casters, one running in the live furrow—provides for the easy running and turning of the machine hitherto not possible with carrying-wheels having no swiveling function. An important advantage of my improvement consists in the organization of the machine in such manner that while the frame and the plow appliances are carried by three wheels, two of which are casters, the plow-beam is made to serve as the draft-tongue of the machine, and the draft thereby is greatly reduced.

I claim—

1. The combination, with the axle having its ends bent and provided with bearing-arms, as described, of a frame-brace part and a frame-beam part clipped to the axle and to its brace, with the right or furrow wheel and a left or land caster-wheel both fixed upon the axle-arms, and a caster-wheel fixed to and carried upon the frame-beam in rear of the axle and the plow, substantially as described.

2. The combination of the frame, the furrow-wheel, the land caster-wheel, and the rear furrow caster-wheel, arranged as described, with the plow having its beam pivoted to the axle-hanger *i* and suspended from the frame-brace by a link, *j*, and having the draft attachment, substantially as described.

3. The combination, with the axle having the right or furrow wheel in advance thereof, a caster-wheel on its left or land end, a frame, and a caster-wheel connected with the latter in rear of the plow, of the plow having its beam pivotally connected to the axle by the hanger *i* and to the front brace by the link *j*, and provided with the draft attachment, substantially as described.

4. The frame consisting of the axle, the front brace, and the longitudinal beam secured to the axle and to the front brace, in combination with the three carrying-wheels, two of which are casters, arranged as described, and the plow-beam pivoted to the frame at its front and rear ends and having the draft attachment, substantially as described.

In testimony whereof I have hereunto set my hand in the presence of two subscribing witnesses.

MILTON T. HANCOCK.

Witnesses:
DAVID B. GOULD,
W. H. JENNINGS.